United States Patent Office 3,330,699
Patented July 11, 1967

3,330,699
METHOD OF OPERATING FUEL CELL CONTAINING FUSED METAL HYDROXIDE AND CARBONATE ELECTROLYTE
Anthony Desmond Shand Tantram, Dorking, Surrey, England, assignor to National Research Development Corporation, London, England, a British corporation
No Drawing. Filed Jan. 31, 1963, Ser. No. 255,192
Claims priority, application Great Britain, Feb. 6, 1962, 4,597/62
8 Claims. (Cl. 136—86)

This invention relates to fuel cells, that is to say electrochemical cells wherein the free energy of combustion of a fuel is converted directly into electrical energy, and the invention is concerned particularly with fuel cells of the kind using fused salt electrolytes.

At least two forms of this kind of fuel cell have been operated successfully and these are (a) medium temperature cells (operating at a temperature about 200° C.) with molten hydroxide electrolytes using a non-carbonaceous fuel, such as hydrogen, in conjunction with a so-called, oxygen (or air) electrode and (b) high temperature cells (operating at 550° C. and above) with molten carbonate electrolytes.

There have been, however, certain limitations in operation of both these forms of cell. Thus, at least in the case of the hydroxides of the alkali metals and of the alkaline earth metals, the equilibrium of the reaction

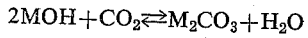
$$2MOH + CO_2 \rightleftharpoons M_2CO_3 + H_2O$$

is strongly on the carbonate side, which means that, in the presence of even small concentrations of carbon dioxide, the hydroxide electrolyte will tend to be chemically converted to the carbonate; and this means that, in the medium temperature type of cell mentioned above, unless strict measures are taken to ensure that the reactant gases are completely free from carbon dioxide, the internal resistance of the cell will gradually rise and the performance of the cell will be affected in consequence. It is also necessary to isolate the eletcrolyte from the atmosphere for the same reason.

Carbonate electrolytes have usually been used in high temperature fused electrolyte cells where the fuel has been carbonaceous, because, then carbon dioxide is one of the products of the electro-chemical reaction and an hydroxide electrolyte would be affected in the manner referred to above. However, with the carbonate electrolyte, the transport of oxygen is by carbonate ions and it is therefore required to form carbonate ions at the positive electrode. This leads to the limitation that this electrode must be supplied with a mixture of carbon dioxide and air or oxygen; otherwise, if the carbon dioxide is omitted, the performance of the cell falls off rapidly due to build-up of alkali metal oxides in the vicinity of the electrode, thus giving rise (a) to concentration polarisation and (b) to ohmic polarisation due to the high resistance of these oxides.

It is an object of the invention to provide an improved arrangement of fuel cell, which is not subject to these limitations.

According to the invention, in a fuel cell, the electrolyte is a mixture of one or more metal hydroxides and one or more metal carbonates, preferably of an alkali metal or of an alkaline earth metal, and the positive electrode is adapted to be supplied with a mixture of water vapour and air (or oxygen).

In a cell in accordance with the invention( oxygen is transported in the fused electrolyte by hydroxyl ions formed at the positive electrode, and the hydroxyl ions are discharged at the fuel electrode preferentially to discharge of carbonate ions.

A cell incorporating a mixed electrolyte and a water vapour/air (oxygen) electrode in accordance with the invention, has some important advantages over the known cells described above. Thus it is not necessary to go to the extent of having to exclude carbon dioxide from the system, and this means, in practice, that, despite the use of hydroxide in the electrolyte, impure hydrogen, and even carbonaceous fuels may be used. This also means that atmospheric air may be used as oxidant without the necessity for removal of carbon dioxide therefrom and that the electrolyte need not be isolated from the atmosphere.

Advantages over the simple carbonate electrolyte cell, with carbon dioxide fed to its air (or oxygen) electrode, are that the mixed hydroxide/carbonate electrolyte has a higher conductivity than that of the pure carbonate electrolyte and that its melting point is also lower, permitting lower temperatures of operation of the cell. In the case of the pure carbonate electrolyte with an air- (or oxygen-) carbon dioxide electrode and using a non-carbonaceous fuel, the carbon dioxide has to be supplied from an outside source—a factor which adds to the cost of operating the cell; but in the cell having the mixed hydroxide/carbonate electrolyte, using the air- (or oxygen-) water vapour electrode, the water vapour requirements for this electrode may be met by bleeding off from the effluent excess water vapour at the fuel electrode side, thus averting such additional cost. In any case, however, it is cheaper and more convenient to provide a separate source of supply of water vapour rather than of carbon dioxide if it is necessary to feed such to a system at the air (or oxygen) electrode.

During operation of fuel cells incorporating the present invention, the optimum mixture of salts will depend upon the operating conditions, but the relationship between numbers of hydroxyl ions and carbonate ions will adapt itself to a steady state condition, and will usually be in the range 2–20 expressed as the ratio of the respective equivalents of carbonate ions to hydroxyl ions. Thus, even if the electrolyte mixture is originally made up giving a relationship outside these limits, the composition will change to the steady state value during the initial period of operation of the cell, probably within a few hours.

In one example of carrying out the invention an electrolyte is made up of sodium hydroxide, sodium carbonate and lithium carbonate in the proportions to give approximately equimolar ratios of sodium and lithium cations and at the same time to ensure that the ratio of carbonate anions to hydroxide anions is approximately 8 to 1, expressed as equivalents. Then, using electrodes of porous silverised zinc oxide, and feeding a mixture of 5 volumes of air to 2 volumes of water vapour to the cathode, while the anodic fuel is hydrogen, it is found that, at a temperature of 600° C., the cell delivers 40 milliamperes per square centimetre at 0.75 volt.

Another way of forming the electrolyte in accordance with the invention, and which may be more convenient in certain circumstances, is to commence with a pure carbonate electrolyte and to operate a cell with its positive electrode fed with an air- (or oxygen-) water vapour mixture of proportions similiar to those mentioned above. In that case hydroxyl ions will be released to the electrolyte and a steady state carbonate ions/hydroxyl ions mixture will be achieved in due course. Alternatively this condition may be achieved by passing a current temporarily from an external source through the cell via an air- (or oxygen-) water vapour electrode.

As an example of the formation of an electrolyte by this indirect method, a cell comprising porous silverised zinc oxide electrodes may be provided with an electrolyte consisting of equimolar quantities of sodium carbonate and lithium carbonate. Then, using hydrogen as anodic fuel and feeding a mixture of 5 volumes of air to 2 volumes of water vapour to the positive electrode it was found in one case that the output at first changed but the cell settled down after a few hours at 600° C. to deliver the same output as in the case of the other example detailed above. The output remained steady for the remainder of the duration of the test which was continued for twenty-four hours. Analysis of the electrolyte at the end of the test indicated that hydroxyl anions were present in the proportion equivalent to approximately one-eighth the number of carbonate anions; in other words the cell was then equivalent to the cell formed by the direct method.

In other examples of the indirect method of forming an electrolyte in accordance with the present proposals, a cell comprising a porous nickel anode and a silverised zinc oxide cathode was provided with an electrolyte consisting of equimolar quantities of sodium carbonate and lithium carbonate and the anodic fuel was reformer gas from a reformer operating at 650° C. on a mixture of one volume of methane to two volumes of water vapour, and the cathode was fed with a mixture of 5 volumes of air to 2 volumes of water vapour. At a temperature of 550° C. the cell reached a steady load condition in approximately one hour, giving 60 milliamperes per square centimetre at a voltage of 0.53 volt, and the cell remained steady for the remainder of the test period.

Analysis of the electrolyte showed that hydroxyl anions were present in the ratio equivalent to the proportion of 16 carbonate anions to one hydroxyl anion, thus indicating that the cell had been formed according to the invention.

In any of the embodiments described above, pipework and control valves and other gear for controlling the flow of reactants to the electrodes will be apparent to those skilled in the art, whether the water vapour for the cathodic reactant mixture be derived from a separate steam generator or whether it be bled from the effluent flow from the fuel electrode. The control need not be highly sensitive because it is probable that, in all cases, the ratio of water vapour to air (or oxygen) in the cathodic mixture may be varied considerably from those specified without substantial effect upon the performance of the cell.

It is understood that the specific embodiments of the invention described above are by way of example only; other embodiments of the invention will be apparent to those skilled in the art. For instance, in the event that more than one metal hydroxide and/or more than one metal carbonate are to be used to form an electrolyte in accordance with the invention, the hydroxides may be of different metals, as may be the carbonates.

I claim:

1. The method of operating a fuel cell which comprises providing as electrolyte a fused mixture of metal hydroxide and metal carbonate and supplying to the positive electrode thereof a mixture consisting essentially of water vapor and an oxidizing gas selected from the group consisting of air and oxygen while supplying a fuel gas to the fuel electrode at the cell, the relative proportions of hydroxide and carbonate being such that oxygen is transported in the fused electrolyte by hydroxyl ions formed at the positive electrode and so that hydroxyl ions are discharged at the fuel electrode rather than carbonate ions.

2. A method as claimed in claim 1 wherein said fused mixture contains carbonate anions in the proportion within the range 2–20 to 1 of hydroxide anions expressed as equivalents.

3. A method as claimed in claim 1 wherein said fused mixture contains carbonate anions in the proportion 8 to 1 of hydroxide anions expressed as equivalents.

4. A method as claimed in claim 1 wherein said electrolyte comprises sodium hydroxide, sodium carbonate and lithium carbonate in the proportions to give approximately equimolar ratios of sodium and lithium cations.

5. A method as claimed in claim 1 wherein the water vapor from said mixture for supply to said positive electrode is derived from recycle of effluent from the fuel electrode.

6. A method as claimed in claim 1 wherein said fuel gas is hydrogen.

7. A method as claimed in claim 6 wherein said hydrogen is derived from an impure source.

8. A method as claimed in claim 1 wherein said fuel gas is a carbonaceous fuel gas.

References Cited

UNITED STATES PATENTS

| | | | |
|---|---|---|---|
| 2,175,523 | 10/1939 | Greger | 136—86 |
| 2,921,110 | 1/1960 | Crowley et al. | 136—86 |
| 3,026,364 | 3/1962 | Jackson et al. | 136—86 |
| 3,082,282 | 3/1963 | Gruneberg et al. | 136—86 |
| 3,132,972 | 5/1964 | Ludwig | 136—86 |
| 3,146,131 | 8/1964 | Linden et al. | 136—86 |
| 3,180,762 | 4/1965 | Oswin | 136—86 |
| 3,198,664 | 8/1965 | Kunz | 136—86 |

WINSTON A. DOUGLAS, *Primary Examiner.*

ALLEN B. CURTIS, *Examiner.*